(12) United States Patent  
Busetti

(10) Patent No.: US 12,000,264 B2
(45) Date of Patent: Jun. 4, 2024

(54) METHOD FOR QUADRIMODAL FAULT PREDICTION USING STRAIN TENSOR CYCLIDES

(71) Applicant: ARAMCO SERVICES COMPANY, Houston, TX (US)

(72) Inventor: Seth Busetti, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 308 days.

(21) Appl. No.: 17/644,103

(22) Filed: Dec. 14, 2021

(65) Prior Publication Data

US 2023/0184093 A1 Jun. 15, 2023

(51) Int. Cl.
*E21B 47/02* (2006.01)
*G01V 20/00* (2024.01)

(52) U.S. Cl.
CPC .............. *E21B 47/02* (2013.01); *G01V 20/00* (2024.01)

(58) Field of Classification Search
CPC .................. E21B 47/02; G01V 99/005; G01V 2210/6242; G01V 2210/642; G01V 2210/646
See application file for complete search history.

(56) References Cited

U.S. PATENT DOCUMENTS

| | | |
|---|---|---|
| 2008/0086287 A1 | 4/2008 | Xu et al. |
| 2010/0149918 A1 | 6/2010 | Heliot et al. |
| 2015/0168597 A1 | 6/2015 | Bai |
| 2016/0245939 A1 | 8/2016 | Williams |
| 2017/0058668 A1 | 3/2017 | Paul |
| 2018/0246238 A1 | 8/2018 | Dong et al. |
| 2019/0129053 A1 | 5/2019 | Wang et al. |
| 2023/0098683 A1* | 3/2023 | Coenen ................... E21B 43/26 166/244.1 |

FOREIGN PATENT DOCUMENTS

| | | |
|---|---|---|
| CN | 108680952 A | 10/2018 |
| CN | 111681314 A | 9/2020 |
| EP | 2735892 A1 | 5/2014 |
| RU | 2007115196 A | 10/2008 |

OTHER PUBLICATIONS

Anderson, E.M., 1951, The dynamics of faulting and dike formation with application to Britain. Oliver and Boyd, 2nd Editition, Edinburgh.

(Continued)

*Primary Examiner* — Manish S Shah
*Assistant Examiner* — Michael J Singletary
(74) *Attorney, Agent, or Firm* — Osha Bergman Watanabe & Burton LLP

(57) ABSTRACT

A method of predicting three-dimensional fracture geometry in a subterranean region of interest is disclosed. The method includes obtaining a strain tensor for the subterranean region of interest, calculating a set of principal strain components from the strain tensor, and determining a strain cyclide from the set of principal strain components. The method further includes calculating a set of quadrimodal fault normal vectors from the strain cyclide and determining an in-plane shear strain magnitude and a shear strain orientation from the set of quadrimodal fault normal vectors.

17 Claims, 10 Drawing Sheets

(56) References Cited

OTHER PUBLICATIONS

Aydin, A. and Z. Reches, 1982, Number and orientation of fault sets in the field and in experiments. Geology, 10(2), 107-112.
Coelho, S. and C. Passchier, 2008, Mohr-cyclides, a 3D representation of geological tensors: The examples of stress and flow. Journal of Structural Geology, 30, 560-601.
Colmenares, L.B. and M.D. Zoback, A statistical evaluation of intact rock failure criteria constrained by polyaxial test data for five different rocks. International Journal of Rock Mechanics & Mining Sciences, 39, 695-729.
Haimson, B., and J.W. Rudnicki, 2010, The effect of the intermediate principle stress on fault formation and fault angle in siltstone. Journal of Structural Geology, 32, 1701-1711.
Healy, D., T.G. Blenkinsop, N.E. Timms, P.G. Meredith, T.M. Mitchell, M.L. Cooke, 2015, Polymodal faulting: Time for a new angle on shear fracture. Journal of Structural Geology, 80, 57-71.
Jaeger, J.C., Cook, N.G.W., and Zimmerman, R., 2010, Fundamentals of Rock Mechanics. Wiley, 461 pages.
Krantz, R.W., 1988, Multiple fault sets and three-dimensional strain: theory and application. Journal of Structural Geology, 10(3), 225-237.
Krantz, R.W., 1989, Orthorhombic fault patterns: the odd axis model and slip vector orientations. Tectonics, 8(3), 483-495.
Ma, X., J.W. Rudnicki, and B.C. Haimson, 2017, Failure characteristics of two porous sandstones subjected to true triaxial stresses: Applied through a novel loading path. Journal of Geophysical Research: Solid Earth, 122, 2525-2540.
Pratt, M.J., 1990, Cyclides in computer aided geometric design. Computer Aided Geometric Design, 7, 221-242.
Reches, Z., 1978, Analysis of faulting in three-dimensional strain field. Tectonophysics, 47(1), 109-129.
Reches, Z., 1983, Faulting of rocks in three-dimensional strain fields II, Theoretical analysis. Tectonophyics, 95(1), 133-156.
Reches, Z. and J.H. Dieterich, 1983, Faulting of rocks in three-dimensional strain fields I, Failure of rocks in polyaxial, sero-control experiments. Tectonophysics, 95(1), 111-132.
Watterson, J., 1999, The future of failure: stress or strain? Journal of Structural Geology, 21(8), 939-948.

\* cited by examiner

METHOD FOR QUADRIMODAL FAULT PREDICTION USING STRAIN TENSOR CYCLIDES

BACKGROUND

Engineers and geoscientists working in the oil and gas industry frequently need to know the fluid-flow characteristics of fractures within subsurface formations to make decisions relating to the design of a hydrocarbon reservoir development strategy, including where to drill wells, and which stimulation techniques, such as hydraulic fracturing and acidizing, to use. In addition, the fluid-flow characteristics of fractures may be important parameters for designing the type and size of surface hydrocarbon production facilities, and for predicting the future economic value of a hydrocarbon reservoir. The fluid-flow characteristics of natural fractures, natural fracture networks, and hydraulic fractures may all be important in making these decisions.

In practical terms, because fracture patterns exert a fundamental control on fluid flow in the subsurface, accurate models that link principal effective strains to the orientations of failure planes are frequently required. A potentially important difference for fluid flow within a subterranean region may be that between a bimodal conjugate fault pattern and a polymodal fault pattern. If fault planes are assumed to be hydraulically sealing, it will be readily understood by one of ordinary skill in the art that a polymodal pattern may result in a strongly compartmentalized fluid reservoir. In contrast, if fault planes are assumed to be hydraulically conductive, the greater length of fracture intersections of a polymodal pattern when compared to a bimodal (conjugate) pattern could produce a higher fluid flow rate and an improved drainage volume in comparison to a conjugate pattern with the same total number of fault planes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method of predicting three-dimensional fracture geometry in a subterranean region of interest. The method includes obtaining a strain tensor for the subterranean region of interest, calculating a set of principal strain components from the strain tensor, and determining a strain cyclide from the set of principal strain components. The method further includes calculating a set of quadrimodal fault normal vectors from the strain cyclide and determining an in-plane shear strain magnitude and a shear strain orientation from the set of quadrimodal fault normal vectors.

In general, in one aspect, embodiments disclosed herein relate to a non-transitory computer readable medium storing instructions executable by a computer processor. The instructions include functionality for obtaining a strain tensor for the subterranean region of interest, calculating a set of principal strain components from the strain tensor, and determining a strain cyclide from the set of principal strain components. The instructions further include functionality for calculating a set of quadrimodal fault normal vectors from the strain cyclide and determining an in-plane shear strain magnitude and a shear strain orientation from the set of quadrimodal fault normal vectors.

In general, in one aspect, embodiments disclosed herein relate to a system for predicting three-dimensional fracture geometry in a subterranean region of interest. The system includes a wellbore tool configured to measure a strain tensor of the subterranean region of interest and a computer system. The computer system is configured to receive the strain tensor measured by the wellbore tool, calculate a set of principal strain components from the strain tensor, and determine a strain cyclide from the set of principal strain components. The computer system is further configured to calculate a set of quadrimodal fault normal vectors from the strain cyclide and determine an in-plane shear strain magnitude and a shear strain orientation from the set of quadrimodal fault normal vectors.

Other aspects and advantages of the claimed subject matter will be apparent from the following description and the appended claims.

BRIEF DESCRIPTION OF DRAWINGS

Specific embodiment of the disclosed technology will now be described in detail with reference to the accompanying figures. Like elements in the various figures are denoted by like reference numerals for consistency.

DETAILED DESCRIPTION

In the following detailed description of embodiment of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a novel method and system for predicting the orientation of geological fault planes, specifically quadrimodal fault planes, and their associated resolved shear strain magnitudes and directions from an observed strain tensor. One or more embodiments use strain cyclides in performing the prediction. The resulting predictions of the geological fault plane orientations may be used in the formulation of a hydrocarbon reservoir, or hydrocarbon field, development strategy.

Figure 1:
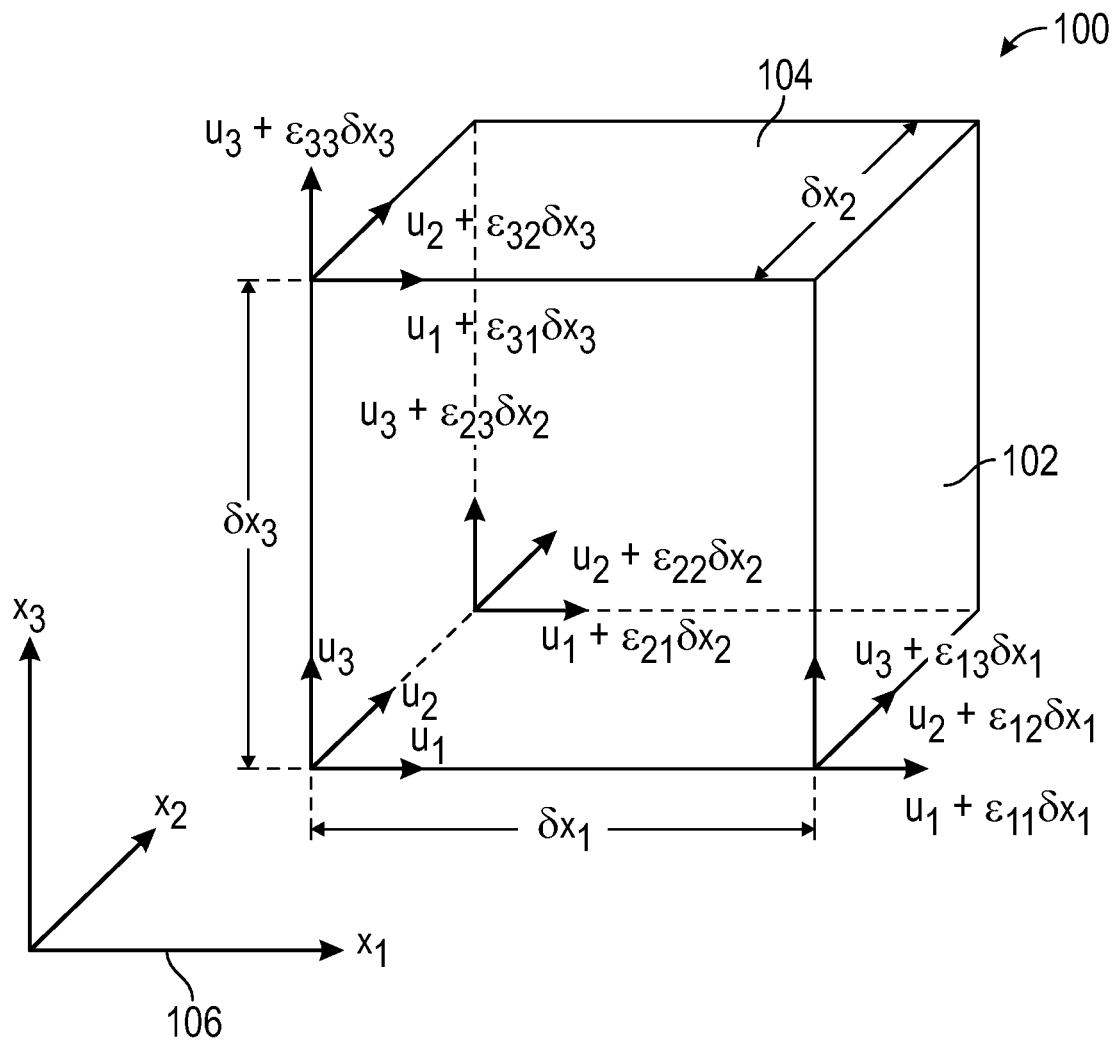
FIG. 1 shows a strain tensor, in accordance with one or more embodiments.

In accordance with one or more embodiments, FIG. 1 shows a unit cube (100) of solid material that may be a cube of rock from a subterranean region of interest. The strain tensor $\varepsilon_{ij}$ is a symmetric second order nine component tensor:

$$\varepsilon = \varepsilon_{ij} = \begin{pmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{pmatrix} \quad \text{Equation (1)}$$

where $\varepsilon_{21}=\varepsilon_{12}$, $\varepsilon_{31}=\varepsilon_{13}$, and $\varepsilon_{31}=\varepsilon_{13}$. Each component of the strain tensor represents a displacement of one face of the cube in a particular direction. For example, $\varepsilon_{12}$ represents the displacement in the 2-direction of the face of the cube normal to the 1-direction (102). Similarly, $\varepsilon_{32}$ represents the displacement in the 2-direction of the face of the cube normal to the 3-direction (104). Equation (1) describes the strain tensor in a particular coordinate system (106) that may be denoted $(x_1, x_2, x_3)$. The coordinate system may be an orthonormal coordinate system. The value of any element of the strain tensor, $\varepsilon$, such as $\varepsilon_{12}$ will depend on the coordinate system chosen. However, it is always possible to find a principal coordinate system such that the strain tensor, $\varepsilon$, is diagonal:

$$\varepsilon = \begin{pmatrix} \varepsilon_1 & 0 & 0 \\ 0 & \varepsilon_2 & 0 \\ 0 & 0 & \varepsilon_3 \end{pmatrix} \quad \text{Equation (2)}$$

where $\varepsilon_1$, $\varepsilon_2$, and $\varepsilon_3$ are called principal strains and the axes of this principal coordinate system are called the principal strain directions and may be denoted $\eta_1$, $\eta_2$, and $\eta_3$.

In accordance with one or more embodiments, the strains observed in subterranean regions may be finite, frequently large, strains rather than negligible or infinitesimal strains. These finite strains are an accumulation of all the incremental infinitesimal strains over the deformation history of the subterranean region. Strain tensors may be determined from regional geological measurements such as satellite data (e.g., InSAR), downhole measurements such as wellbore based strain gauges, computed from geomechanical modeling (e.g., finite element or boundary element solutions), using field stress measurements (e.g., earthquake focal mechanisms, wellbore breakouts, pump-in tests, log-based stress models), estimated from predictive kinematic models (strain-based models for faulting), and from observations of the distortions of objects, such as fossils, that exhibited symmetry at their time of deposition.

In accordance with other embodiments, the strains may be infinitesimal incremental strains. In some cases, the orientation of geological fault planes and failure surfaces may be determined and become fixed at an early stage of deformation where small or infinitesimal shear and volumetric strains are more appropriate than finite strain estimates. Subsequently, finite and often large strains may develop along these geological fault planes.

Figure 2:
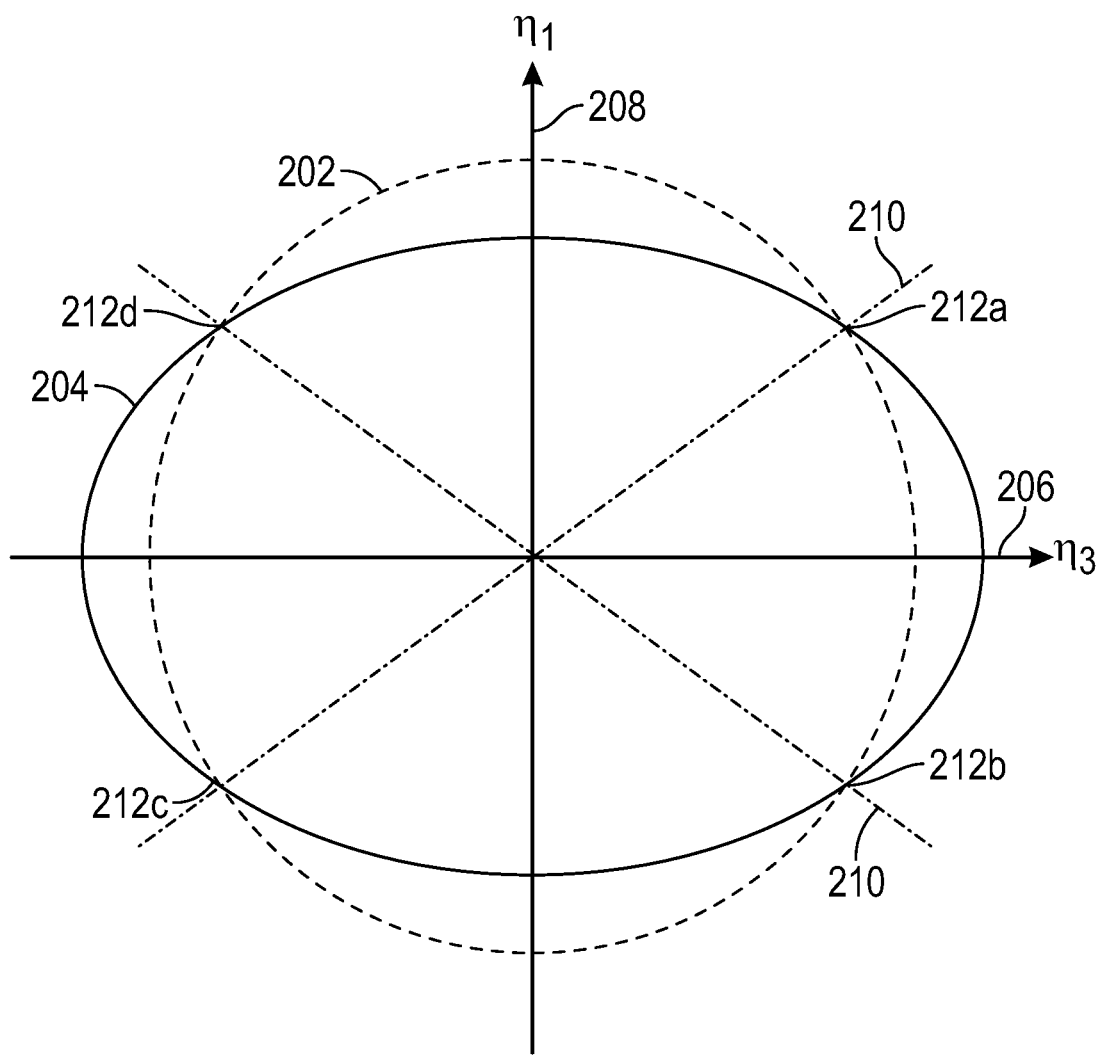
FIG. 2 shows a system, in accordance with one or more embodiments.

FIG. 2 shows a two-dimensional cross-section through an example of an unstrained sphere (202) and a strained sphere (204), in accordance with one or more embodiment. The strained sphere may be elongated along the axis of maximum principal strain (206) and may be contracted along the axis of minimum principal strain (208). The strained sphere (204) and the unstrained sphere (202) may intersect at a number of points (212a, 212b, 212c, 212d) where the length of the line joining the point on the surface of the sphere to the center of the sphere does not change under deformation. These lines may be call "no finite longitudinal strain (NFLS)" lines. NFLS lines may only exist when at least one of the principal strains is negative, corresponding to a compressive strain, and at least one of the principal strains is positive, corresponding to an extensional strain. Thus, since the principal strains may always be arranged by definition such that $\varepsilon_1 \le \varepsilon_2 \le \varepsilon_3$, NFLS lines may only exist if $\varepsilon_1 \le 0$ or $\varepsilon_1$, $\varepsilon_2 \le 0$ while $0 \le \varepsilon_3$.

Figure 3A:
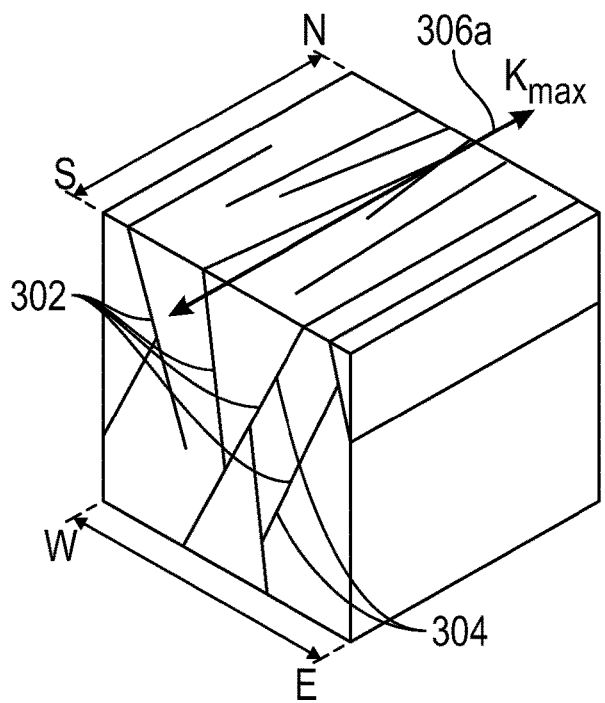
FIGS. 3A-3D show fracture patterns, in accordance with one or more embodiments.
Figure 3B:
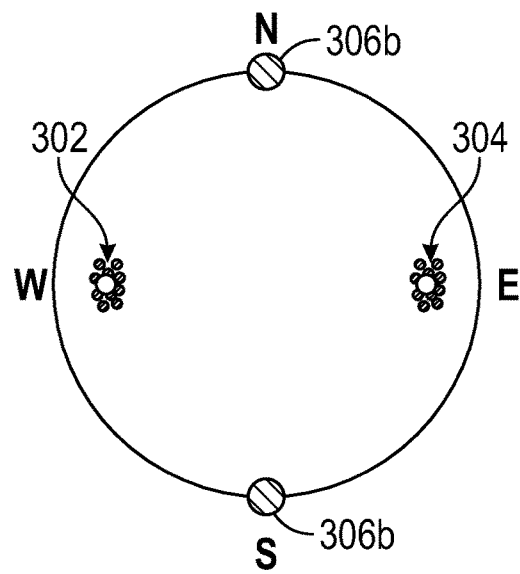

The strike of a fault is the direction of the line formed where the fault plans intersects a horizontal surface, such as the Earth's surface. The dip of the fault is the maximum angle below the horizontal at which the fault plane sinks into the subsurface. FIGS. 3A and 3B depict the faults that may develop, in accordance with one or more embodiments, to accommodate strain in the case where the intermediate strain $\varepsilon_2=0$. In this case, the fault planes may form a first set (302) that share the same or similar strike and dip with one another and may form a second set (304) with the same strike as the first set (302) but a conjugate dip compared to the first set (302). In the example shown in FIG. 3A, the strike of both sets of faults is approximately North-South. However, the first set of faults (302) dip towards the East while the second set of faults (304) dip at a similar angle to the West.

The relationship between the strike and dip of the two sets of faults (302, 304) are depicted further in a stereographic projection in FIG. 3B. In FIG. 3B directions of the normal to the fault plane, often called "poles", are plotted in a stereographic projection. The poles of the first set of faults (302) plot close to the West side of the stereographic projection, while the poles of the second set of faults (304) plot close to the East side of the stereographic projection.

It will be readily apparent to one of ordinary skill in the art that whether the fault planes form high fluid conductivity conduits or low fluid conductivity barriers the bimodal distribution of faults depicted in FIGS. 3A and 3B will have a greater permeability in the North-South direction than in the East-West direction as indicated by the arrow (306a) in FIG. 3A and the polar points (306b) in FIG. 3B.

Figure 3C:
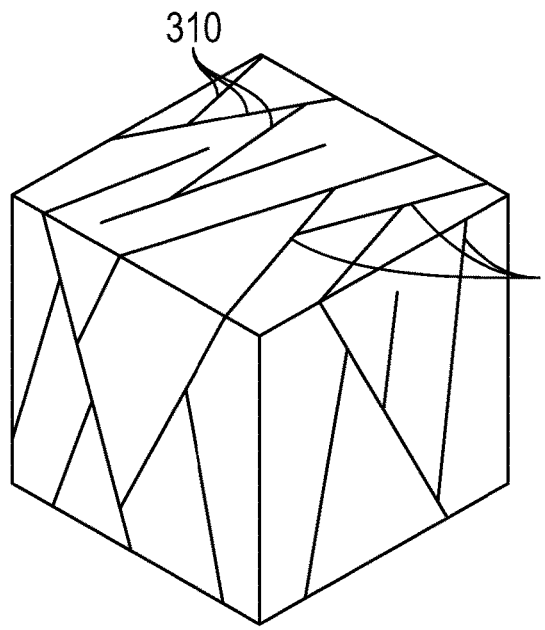
Figure 3D:
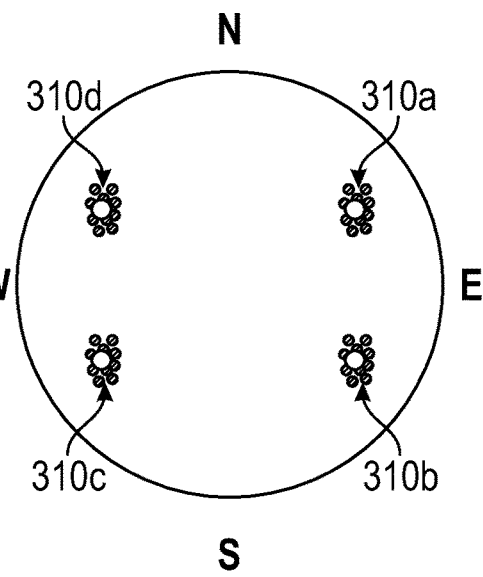

In contrast, in cases where $\varepsilon_2$ is not close or equal to zero, faulting may develop in a "quadrimodal" pattern as illustrated in FIGS. 3C and 3D. In quadrimodal faulting the poles of the fault planes fall into four clusters (310a, 310b, 310c, 310d) as depicted in the stereographic projection FIG. 3D and the quadrimodal fault planes (310) may intersect one another more frequently. In this case, if the fault planes form high fluid conductivity conduits the effective permeability of the faulted subterranean region may be high, and the region may be effectively drained of fluid during hydrocarbon production. However, if the fault planes form low fluid conductivity barriers then the effective permeability of the faulted subterranean region may be low, and production of hydrocarbons may be slow and difficult.

Figure 4:
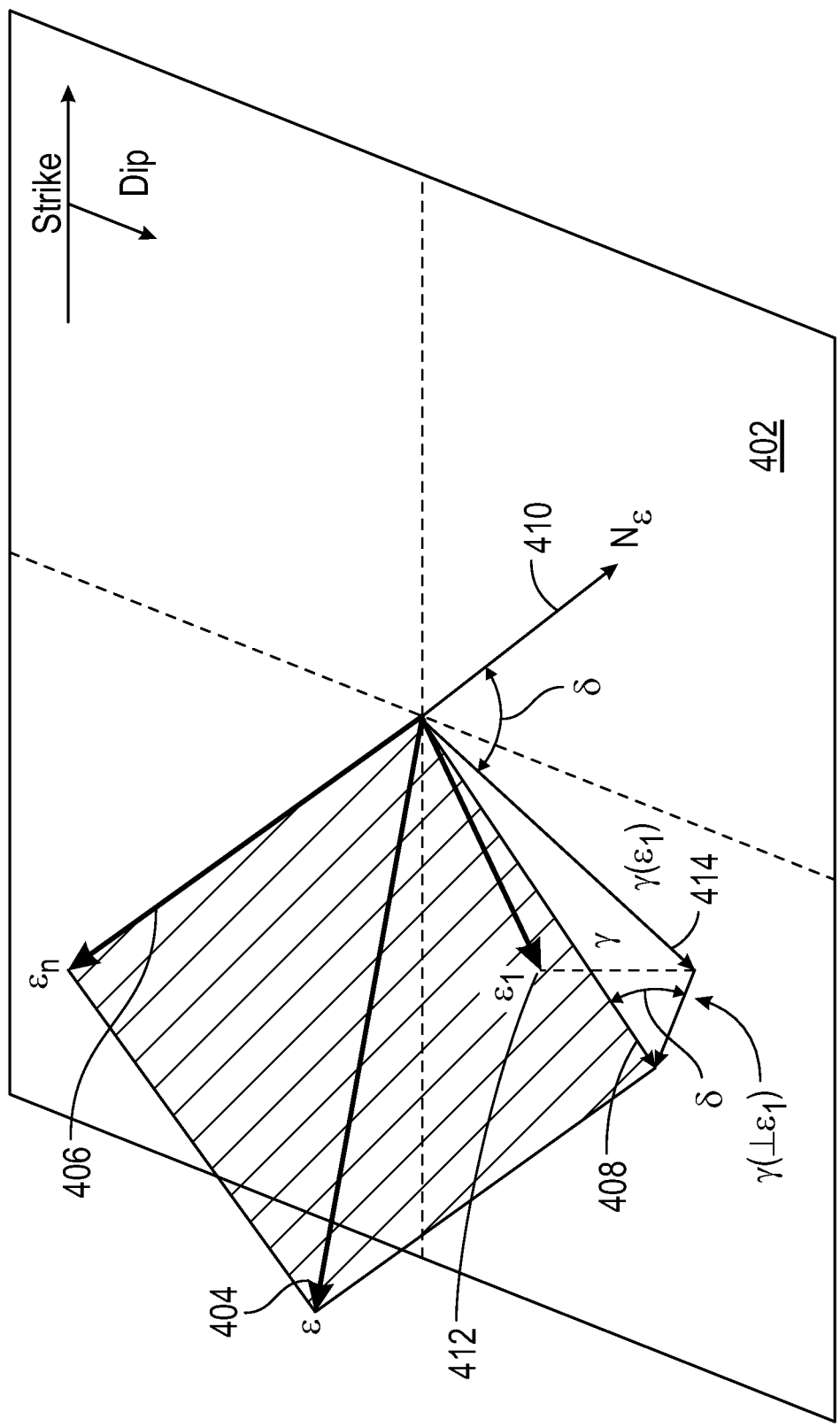
FIG. 4 shows a fault plane geometry, in accordance with one or more embodiments.

In accordance with one or more embodiments, faults form parallel to surfaces of NFLS and the geometrical relationship between the strain tensor and a fault plane (402) is depicted in FIG. 4. The vector sum of the principal strains, ε, is given by:

$$\varepsilon = \varepsilon_1 \eta_1 + \varepsilon_2 \eta_2 + \varepsilon_3 \eta_3 \qquad \text{Equation (3)}$$

while the component of principal strain lying along the normal to the fault plane is denoted $\varepsilon_n$ (406). In general, ε (402) does not lie in the fault plane (402) and its projection onto fault plane (402) gives the shear strain vector γ (408) on the fault plane. The vector $N_e = \varepsilon_n \times \gamma$, (410) where "×" denotes the vector product, lies in the fault plane and is orthogonal to both $\varepsilon_n$ (406) and γ (408). $N_e$ is the in-plane orthogonal component of strain and determines the direction of maximum shear motion on the fault surface. The smallest principal component, $\varepsilon_1$, (412) does not in general lie in the fault plane and its projection onto the fault plane (402) may be denoted γ($\varepsilon_1$) (414). The angle between $N_e$ (410) and γ($\varepsilon_1$) (414) may be denoted δ which is also the angle between the normal to γ($\varepsilon_1$) which is denoted γ($\perp \varepsilon_1$). In accordance with one or more embodiments, the directions of $\varepsilon_n$, γ($\varepsilon_1$), and γ($\perp \varepsilon_1$) may be used to define the axes of the strain cyclide.

Figure 5:
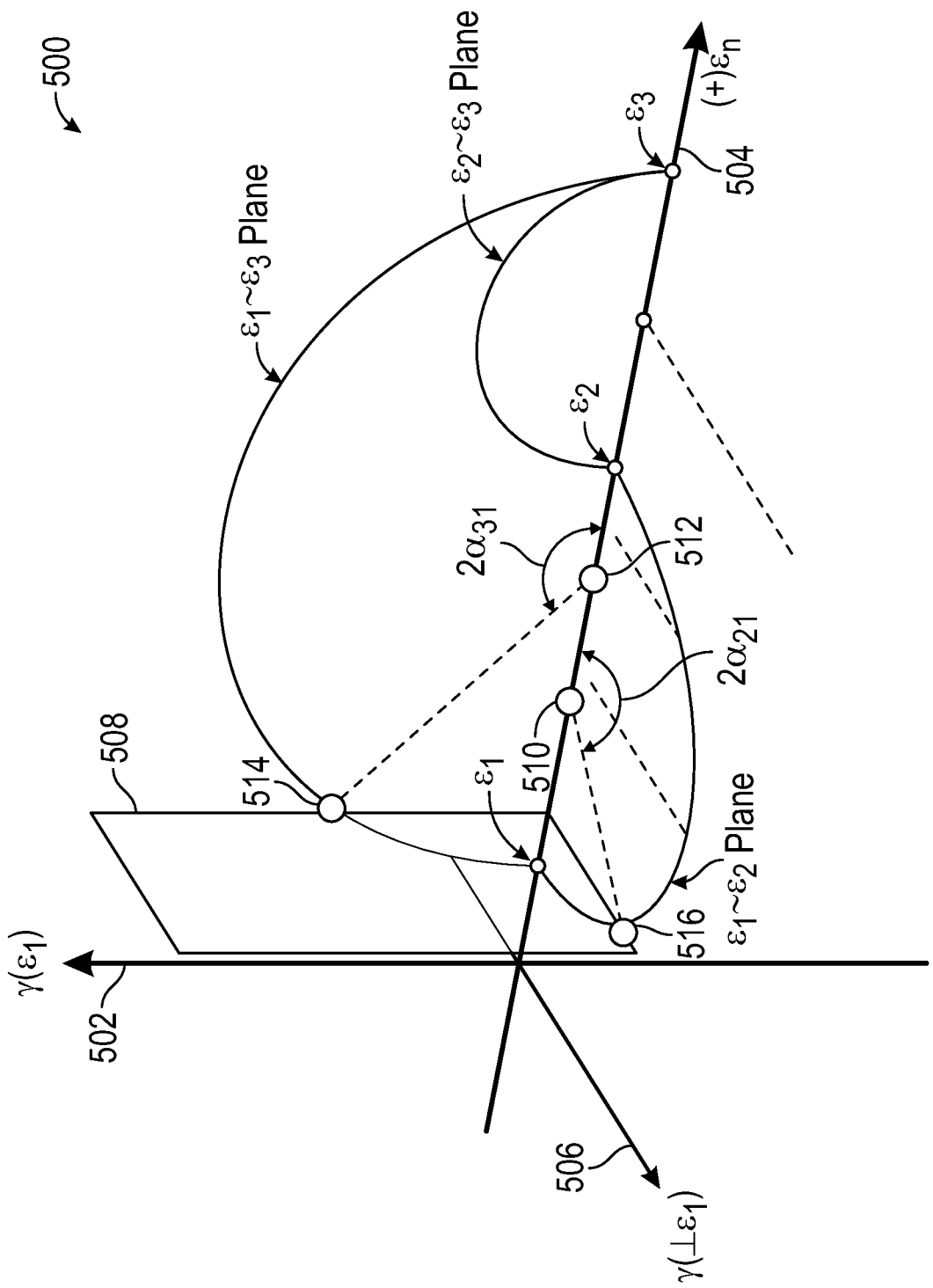
FIG. 5 shows a Mohr strain cyclide, in accordance with one or more embodiments.

In accordance with one or more embodiments, a strain tensor may be represented by a strain cyclide, as depicted in FIG. 5. A generic cyclide may be defined by an implicit equation:

$$(x^2+y^2+z^2-D^2+B^2)^2 = 4(Ax-CD)^2 + 4(By)^2. \qquad \text{Equation (4)}$$

Generic cyclides are centered at the origin of the coordinate system (x,y,z) but a strain cyclide may require a further generalization obtained by adding an extra parameter, E, and rewriting equation (4) in a parametric form:

$$x = \frac{B\sin\psi(C\cos\theta - D)}{A - C\cos\theta\cos\psi} \qquad \text{Equation (5)}$$

$$y = \frac{D(C - A\cos\theta\cos\psi) + B^2\cos\theta}{A = C\cos\theta\cos\psi} + E, \text{ with } \theta \geq 0° \text{ and } \psi \leq 180°,$$

$$z = \frac{B\sin\theta(A - D\cos\psi)}{A - C\cos\theta\cos\psi}$$

where θ≥0° and ψ≤180°. A, B, C, and D are constant parameters with $B^2 = A^2 - C^2$ and the relative magnitude of A, C, and D controlling the cyclide shape.

For a strain cyclide these parameters are derived from the principal strains:

$$A = \frac{2\varepsilon_1 - \varepsilon_2 - \varepsilon_3}{4} \qquad \text{Equation (6)}$$

$$C = \frac{\varepsilon_1 - \varepsilon_2}{4}$$

$$E = \varepsilon_1 - A$$

$$B = \sqrt{A^2 - C^2}$$

$$D = C.$$

The variables x, y, and z indicate position along axes defined by γ($\varepsilon_1$) (502), $\varepsilon_n$, (504) and γ($\perp \varepsilon_1$) (506) respectively. The principal strains, $\varepsilon_1$, $\varepsilon_2$, and $\varepsilon_3$, are marked and constitute the intersection of Mohr circles with the y-axis (504). The shear strain γ is zero at these points. The NFLS plane (508), which by assumption lies between $\varepsilon_1$ and $\varepsilon_2$ is also shown on FIG. 5. The intersection of the NFLS plane with the strain cyclide in the $\varepsilon_1 \sim \varepsilon_3$ plane defines a value of γ($\varepsilon_1$) (514) and the intersection of the NFLS plane with the strain cyclide in the $\varepsilon_1 \sim \varepsilon_2$ plane defines a value of γ($\perp \varepsilon_1$) (516). The angle formed by the line joining the mid-point (510) between $\varepsilon_1$ and $\varepsilon_3$ with γ($\varepsilon_1$) and the positive $\varepsilon_n$ axis is denoted $2\alpha_{31}$. Similarly, the angle formed by the line joining the mid-point (512) between $\varepsilon_1$ and $\varepsilon_2$ with γ($\perp \varepsilon_1$) and the positive $\varepsilon_n$ axis is denoted $2\alpha_{21}$. The angle $\alpha_{31}$ is given by:

$$\alpha_{31} = \frac{\pi}{2} - \frac{\cos^{-1}\left(\frac{(\varepsilon_3 + \varepsilon_1)}{(\varepsilon_3 - \varepsilon_1)}\right)}{2} \qquad \text{Equation (7)}$$

and $$\alpha_{21} = \frac{\pi}{2} - \frac{\cos^{-1}\left(\frac{(\varepsilon_2 + \varepsilon_1)}{(\varepsilon_2 - \varepsilon_1)}\right)}{2}. \qquad \text{Equation (8)}$$

The orientation of four quadrimodal fault planes are given by Equation (7) and Equation (8) with the normal to one quadrimodal fault plane for each of the angles $\pm\alpha_{31}$ and $\pm\alpha_{21}$ in the coordinate system defined by the principal strains ($\varepsilon_1$, $\varepsilon_2$, $\varepsilon_3$). The orientation of the quadrimodal fault planes in the field coordinate system, e.g., North-South, East-West, Up-Down, may be obtained by coordinate transformations well known to one of ordinary skill in the art.

In accordance with one or more embodiments, the normal vector to each of the quadrimodal faults, denoted $\propto_{ni}$, i=1, . . . 4, may be given in the field coordinate system by:

$$\propto_{n1} = \{n(1), n(2), n(3)\} \qquad \text{Equation (9)}$$

$$\propto_{n2} = \{-n(1), -n(2), n(3)\} \qquad \text{Equation (10)}$$

$$\propto_{n3} = \{-n(1), n(2), n(3)\} \qquad \text{Equation (11)}$$

$$\propto_{n4} = \{n(1), -n(2), n(3)\}. \qquad \text{Equation (12)}$$

where the symmetry of the fault plane orientation is reflected in the fact each normal is determined by a permutation of the vector {n(1), n(2), n(3)}.

The resolved in-plane strain vector, e(i), for the i-th quadrimodal fault may then be calculated as:

$$e(i) = \varepsilon \cdot \propto_{ni} \qquad \text{Equation (13)}$$

The magnitude of the resolved normal strain vector, $\varepsilon_n$, is given by:

$$\varepsilon_n(i) = e(i) \cdot \propto_{ni} = \propto_{ni} \cdot e(i) \cdot \propto_{ni} \qquad \text{Equation (14)}$$

and the magnitude of the in-plane shear strain vector, $$\gamma(i) = \sqrt{(e(i)^T \cdot e(i) - \varepsilon_n^2(i))} \qquad \text{Equation (15)}$$

In general, there are four solutions, one for each quadrimodal fault plane and each fault plane is index by i.

The resolved normal strain vector acts perpendicular to the surface and describes either extension or contraction. The maximum shear strain vector lies on the face of the fault plane and controls motion parallel to the surface. Under idealized frictionless conditions the maximum shear vector is parallel to the slip direction, or fault "rake", and determines whether the fault is in reverse, strike, or oblique slip condition. For plane strain conditions, the fault orientation, shear vector, and resulting slip direction do not depend on the intermediate principle strain, $\varepsilon_2$. In the case of plane strain, γ given by equation (15) is determined by the intersection of the NFLS plane with the $\varepsilon_1 \sim \varepsilon_3$ circle at the point z=0.

Figure 6:
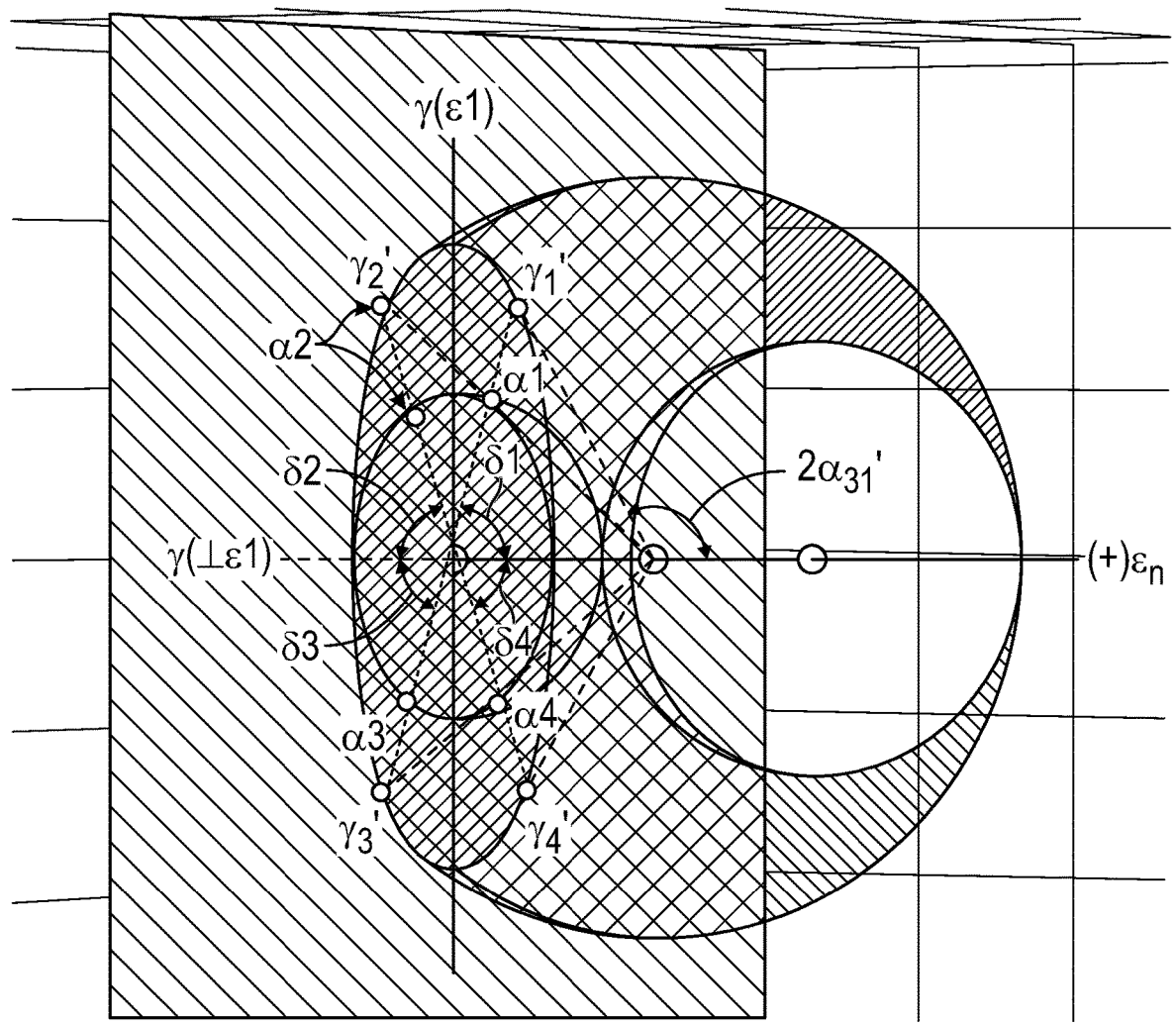
FIG. 6 shows a Mohr strain cyclide, in accordance with one or more embodiments.

However, for quadrimodal faults formed under oblate strain conditions, $\varepsilon_1 \approx 0$, this independence is no longer true and the actual shear strain on the fault surface calculated by equation (15) is now represented by the parameter γ' which still falls at the intersection of the NFLS plane with the strain cyclide but between the $\varepsilon_1$-$\varepsilon_3$ and $\varepsilon_1$-$\varepsilon_3$ circles, as shown in FIG. 6.

In accordance with one or more embodiments, the predicted fault angle and the magnitude and direction of the resultant shear strain vectors may be reconciled. Reconciliation is achieved when the magnitude of the true in-plane shear strain, γ, calculated from equation (15) lies on the strain cyclide at the intersection of the NFLS plane as shown in FIG. 6. The rotation angle, δ, may be determined by first calculating the pole on the strain plane, $N_\varepsilon$:

$$N_\varepsilon = \varepsilon_n \times \gamma \quad \text{Equation (16)}$$

and then determining the projection of $\varepsilon_n$ onto $N_\varepsilon$:

$$\delta = \cos^{-1}\left(\frac{N_\varepsilon \cdot \varepsilon_n}{|N_\varepsilon| \cdot |\varepsilon_n|}\right). \quad \text{Equation (17)}$$

Figure 7:
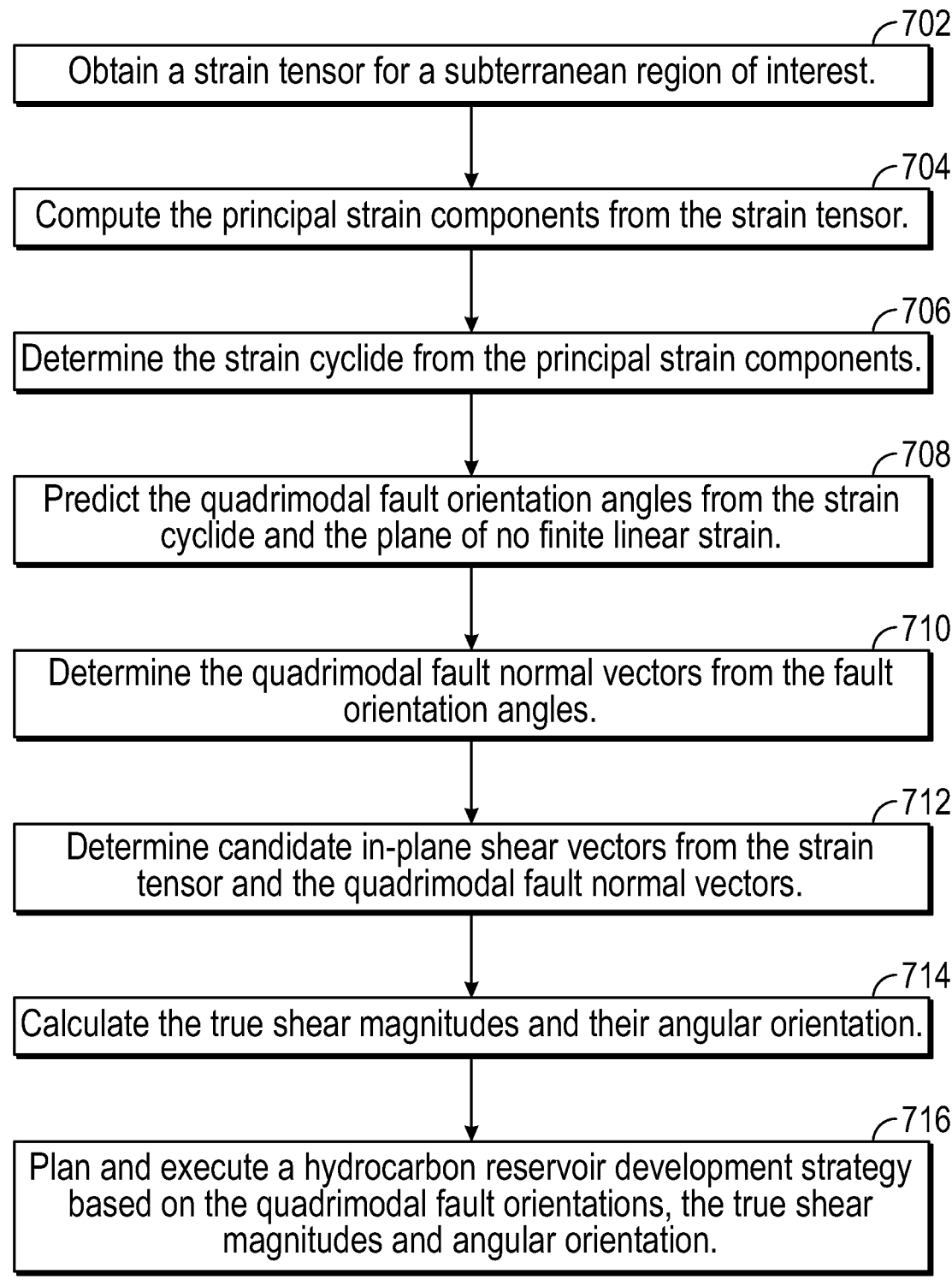
FIG. 7 shows a flowchart in accordance with one or more embodiments.

FIG. 7 shows a flowchart, in accordance with one or more embodiments. In Step 702 a strain tensor is obtained for a subterranean region of interest. In accordance with some embodiments, strain tensors may be finite strain tensors. In accordance with other embodiments, strain tensors may be infinitesimal strain tensors. Finite strain tensors may be determined from regional geological measurements such as satellite data (InSAR), observations of the distortions of objects, such as fossils, that exhibited symmetry at their time of deposition, computed with geomechanical modeling (e.g., finite element or boundary element modeling), and estimated from predictive kinematic models (strain-based models for faulting). In addition, infinitesimal strain tensors may be determined from downhole measurements, such as wellbore-based strain gauges, and from field stress measurements, such as earthquake focal mechanisms, wellbore breakouts, pump-in tests, log-based stress models.

In Step 704, a set of principal strain components may be determined from the strain tensor, in accordance with one or more embodiment. There may be three principal strain components in the set which may be found by solving an eigenvalue equation:

$$\begin{pmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{pmatrix} \begin{pmatrix} \zeta_1^{(i)} \\ \zeta_2^{(i)} \\ \zeta_3^{(i)} \end{pmatrix} = \lambda^{(i)} \begin{pmatrix} 1 & 0 & 0 \\ 0 & 1 & 0 \\ 0 & 0 & 1 \end{pmatrix} \quad \text{Equation (18)}$$

where i=1,2,3. The eigenvalues $\lambda^{(i)}$ give the scalar magnitude of the principal strain components $\varepsilon_1$, $\varepsilon_2$, and $\varepsilon_3$, and the eigenvectors $\eta^{(i)} = (\zeta_1^{(i)}, \zeta_2^{(i)}, \zeta_3^{(i)})$, i=1,2,3, given the principal strain directions. In some embodiments, the strains may be arranged in order of signed magnitude, e.g., $\varepsilon_1 \leq \varepsilon_2 \leq \varepsilon_3$, or $\varepsilon_3 \leq \varepsilon_2 \leq \varepsilon_1$, and in some embodiments the sign of the smallest principal strain component may be negative.

In Step 706 a strain cyclide may be determined, in accordance with one or more embodiments. A strain cyclide may be determined from the principal strain components using equations (5) and (6) provide explicitly above.

In Step 708, in accordance with one or more embodiments, the quadrimodal fault orientations angles may be predicted from the intersection of the strain cyclide with the no finite longitudinal strain (NFLS) plane. The quadrimodal fault orientations angles, $\alpha_{31}$ in the $\varepsilon_1$~$\varepsilon_3$ plane and $\alpha_{21}$ in the $\varepsilon_1$~$\varepsilon_2$ plane, may be determined. $\alpha_{31}$ and $\alpha_{21}$ may be determined graphically, in accordance with some embodiments, or may be determined using equations (7) and (8) in accordance with other embodiments.

In Step 710, the quadrimodal fault normal vectors from the fault orientation angles may be determined, in accordance with one or more embodiments.

In Step 712, candidate in-plane shear vectors may be determined from the strain tensor and the quadrimodal fault normal vectors using equations (13), (14) and (15).

In Step 714, in accordance with one or more embodiments, the magnitude and orientation of the true in-plane shear vector may be determined. The magnitude and orientation of the true in-plane shear vector may be determined by solving equations (16) and (17) to find a rotation angle, δ, such that the magnitude of the true in-plane shear strain, γ, calculated from equation (15) lies on the strain cyclide at the intersection of the NFLS plane. The solution may be achieved using a graphical method, or a trial and error manual calculation, or by solving a numerical inversion problem either manually or using a computer processor.

In Step 716 a hydrocarbon reservoir development strategy may be planned and executed based, at least in part, on the quadrimodal fault orientations, the true shear magnitudes, and angular orientation. After discovery and initial appraisal of a hydrocarbon reservoir or field a hydrocarbon reservoir development strategy may be formulated to plan the safe and efficient production of hydrocarbons from the reservoir. The strategy may include defining the type, size and location of surface facilities, such as production rigs, pipelines, and gas-oil separation plants. The strategy may further include the type, surface location and subsurface trajectory of wellbores to be drilled to reach and penetrate the reservoir, and from which to produce hydrocarbons. The strategy may also include specifying the type of completions to use including whether wells should be uncased or contain slotted-liners, whether hydraulic fracturing and/or acidizing is utilized, and whether surface or downhole pumps are needed to produce the hydrocarbons. The strategy may still further determine whether the injection of fluid, typically water, is required at locations within the reservoir to raise, maintain, or slow the decline in reservoir pressure. Further, the strategy may include enhanced oil recovery (EOR) methods, such as the injection of steam to reduce the viscosity of oil. The hydrocarbon reservoir development strategy may be influenced by the assessment of geological factors, geographical, and economic factors. The geological factors may include the location, intensity, orientation and interconnectedness of faults and fractures and the porosity and permeability of the hydrocarbon reservoir.

Figure 8A:
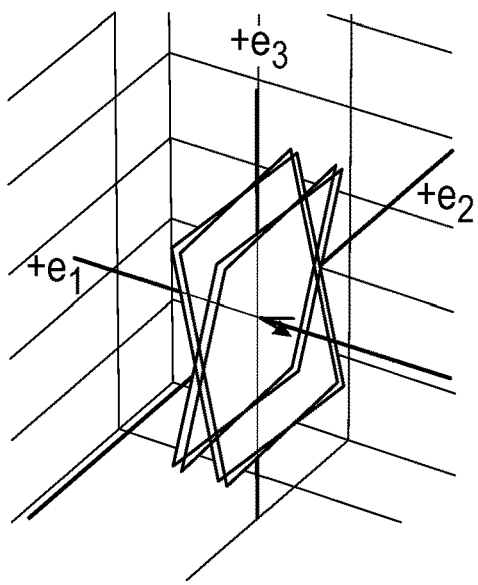
FIGS. 8A-8D show examples of predicted quadrimodal fault patterns in accordance with one or more embodiments.
Figure 8B:
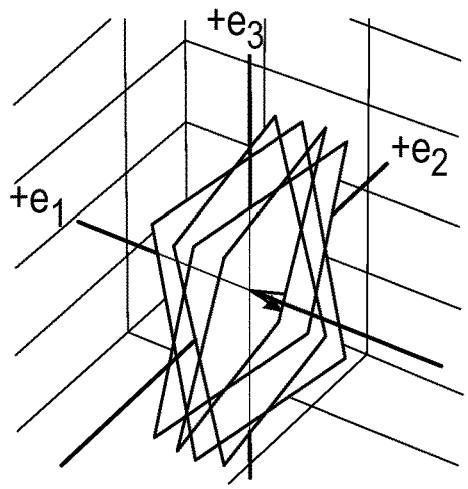
Figure 8C:
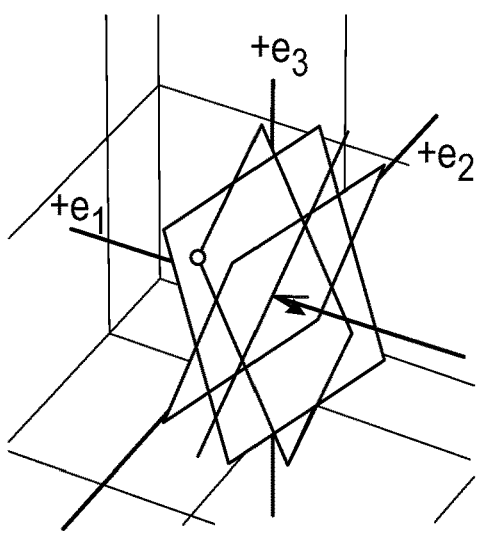
Figure 8D:
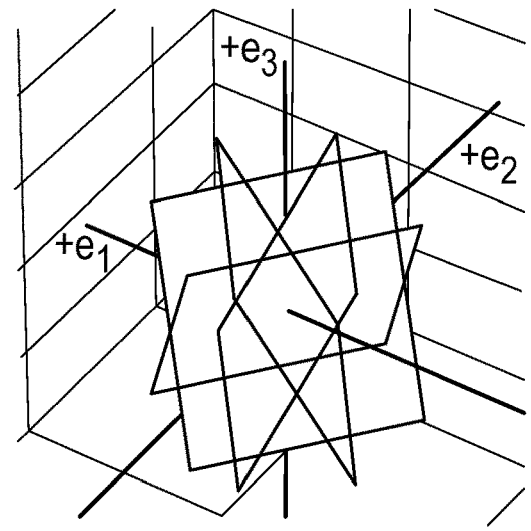

FIG. 8A-8D show examples of the quadrimodal planes predicted by one or more embodiments. FIG. 8A shows predicted faults for principal strain component values $e_1$=0.3, $e_2$=0.001, $e_3$=−0.5. In this case, where $e_2$ is close to zero the resulting sets of predicted fault planes are close to bimodal, as illustrated in FIGS. 3A and 3B. FIG. 8B shows the result of the intermediate principal strain value $e_2$ increasing by a factor of ten compared to FIG. 8A, so that $e_2$=0.01. Similarly, FIG. 8C shows the result of the intermediate principal strain value $e_2$ increasing by a further factor of ten to $e_2$=0.1. Finally, FIG. 8D shows the predicted faults for principal strain component values $e_1$=0.3, $e_2$=0.3, $e_3$=−0.5, i.e., for $e_1$=$e_2$. The progression illustrated from FIG. 8A to FIG. 8D depicts a gradual transition from bimodal fault planes to quadrimodal fault planes.

Figure 9:
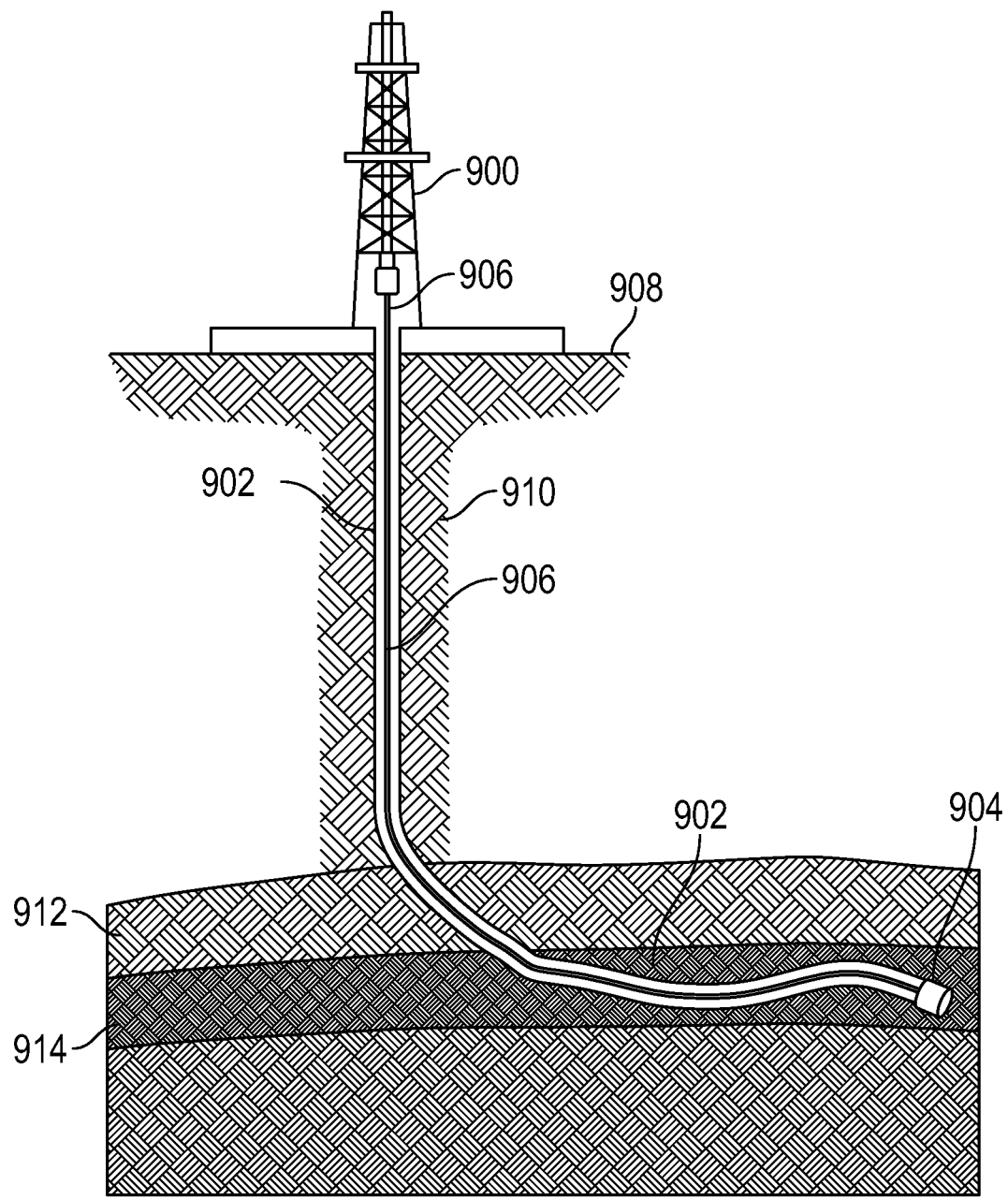
FIG. 9 shows a system in accordance with one or more embodiments.

FIG. 9 illustrates systems in accordance with one or more embodiments. The planning and drilling of a wellbore are an example of commons step in planning and executing a hydrocarbon reservoir production strategy. As shown in FIG.

9, a wellbore (902) may be drilled by a drill bit (904) attached by a drillstring (906) to a drill rig (900) located on the Earth's surface (908). The well may traverse a plurality of overburden layers (910) and one or more cap-rock layers (912) to a hydrocarbon reservoir (914). In accordance with one or more embodiments, the determination of the orientation of geological fault planes, as shown in FIG. 7, may be used to plan and perform a curved wellbore path (906). The trajectory of the curved wellbore path (906) may be based, at least in part, on the orientation of the fault planes and the magnitude and orientation of the principal in-plane shear.

The orientation of the fault planes and the magnitude and orientation of the principal in-plane shear may be used in other steps of planning and executing a hydrocarbon reservoir production strategy including, without limitation, which completion and stimulation techniques to use and at what locations within the hydrocarbon reservoir, and what type and size of surface hydrocarbon production facilities to construct.

Figure 10:
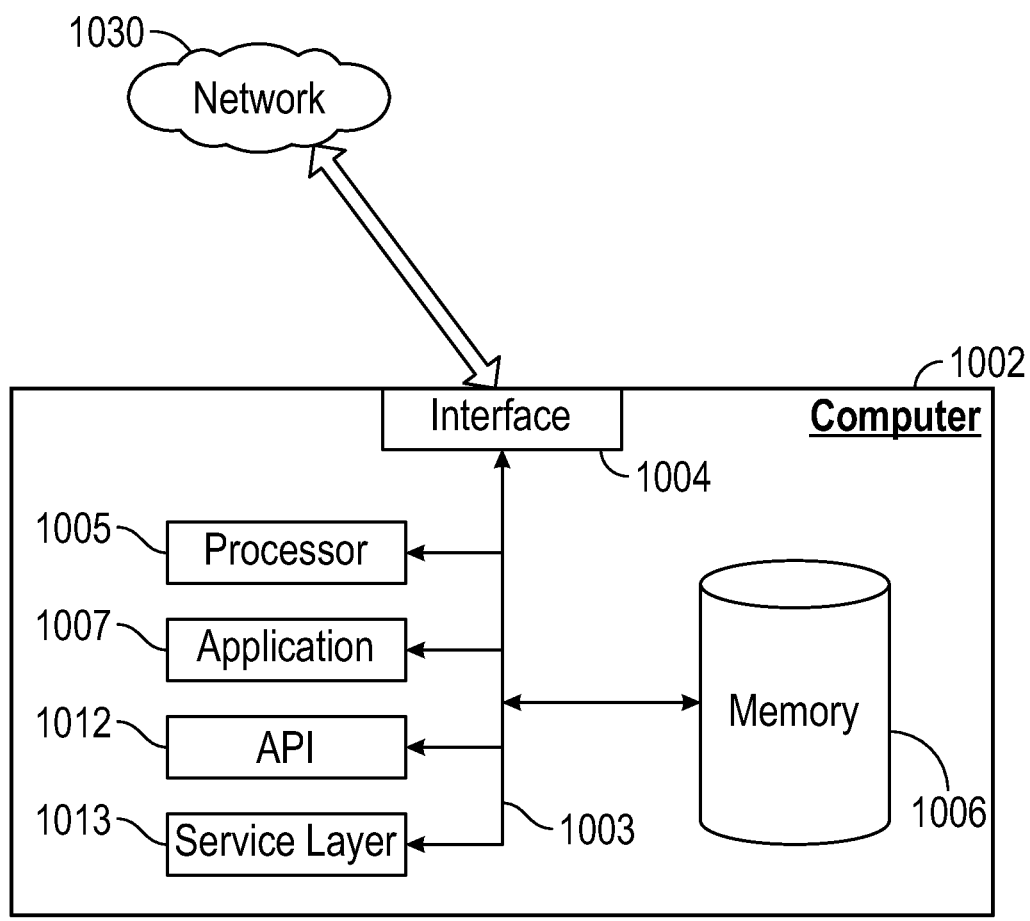
FIG. 10 shows a computer system in accordance with one or more embodiments.

Embodiment may be implemented on a computer system. FIG. 10 is a block diagram of a computer system (1002) used to provide computational functionalities associated with described algorithms, methods, functions, processes, flows, and procedures as described in the instant disclosure, according to an implementation. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a graphical user interface (GUI).

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether illustrated, or) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004 includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiment without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of determining three-dimensional fracture geometry in a subterranean region of interest, comprising:
   obtaining a strain tensor for the subterranean region of interest;
   calculating a set of principal strain components from the strain tensor;
   determining a strain cyclide from the set of principal strain components;
   calculating a set of quadrimodal fault normal vectors from the strain cyclide;
   determining an in-plane shear strain magnitude and a shear strain orientation associated with a quadrimodal fault from the set of quadrimodal fault normal vectors; and
   determining a hydrocarbon reservoir development plan based, at least in part, on the in-plane shear strain magnitude and the shear strain orientation,
   wherein the hydrocarbon reservoir development plan comprises a wellbore trajectory planned to penetrate a hydrocarbon reservoir within the subterranean region of interest.

2. The method of claim 1, further comprising:
   executing the hydrocarbon reservoir development plan by drilling, using a drilling system, the wellbore trajectory to penetrate the hydrocarbon reservoir.

3. The method of claim 1, wherein the strain tensor comprises a finite strain tensor obtained from a satellite measurement dataset.

4. The method of claim 1, wherein determining the strain cyclide comprises:
   determining four cyclide parameters based on a plurality of combinations of three principal components of the strain tensor; and
   forming a surface in cartesian space, wherein the surface is defined by a function quartic in each cartesian coordinate and by the four cyclide parameters.

5. The method of claim 1, wherein calculating the set of quadrimodal fault normal vectors comprises predicting a set of fault orientation angles based, at least in part, on the strain cyclide and a plane of no finite linear strain.

6. The method of claim 5, wherein predicting the set of fault orientation angles comprises determining a set of intersection points of the strain cyclide with the plane of no finite linear strain.

7. A non-transitory computer readable medium storing instructions executable by a computer processor, the instructions comprising functionality for:
   obtaining a strain tensor for a subterranean region of interest;
   calculating a set of principal strain components from the strain tensor;
   determining a strain cyclide from the set of principal strain components;
   calculating a set of quadrimodal fault normal vectors from the strain cyclide;
   determining an in-plane shear strain magnitude and a shear strain orientation associated with a quadrimodal fault from the set of quadrimodal fault normal vectors; and
   determining a hydrocarbon reservoir development plan based, at least in part, on the in-plane shear strain magnitude and the shear strain orientation,
   wherein the hydrocarbon reservoir development plan comprises a wellbore trajectory planned to penetrate a hydrocarbon reservoir within the subterranean region of interest.

8. The non-transitory computer readable medium of claim 7, wherein the strain tensor comprises a finite strain tensor obtained from a satellite measurement dataset.

9. The non-transitory computer readable medium of claim 7, wherein determining the strain cyclide comprises:
   determining four cyclide parameters based on a plurality of combinations of three principle components of the strain tensor; and
   forming a surface in cartesian space, wherein the surface is defined by a function quartic in each cartesian coordinate and by the four cyclide parameters.

10. The non-transitory computer readable medium of claim 7, wherein calculating the set of quadrimodal fault normal vectors comprises predicting a set of fault orientation angles based, at least in part, on the strain cyclide and a plane of no finite linear strain.

11. The non-transitory computer readable medium of claim 10, wherein predicting the set of fault orientation angles comprises determining a set of intersection points of the strain cyclide with the plane of no finite linear strain.

12. A system for predicting three-dimensional fracture geometry in a subterranean region of interest, comprising:

a wellbore tool configured to measure a strain tensor of the subterranean region of interest; and a computer system configured to:
  receive the strain tensor from the wellbore tool;
  calculate a set of principal strain components from the strain tensor;
  determine a strain cyclide from the set of principal strain components;
  calculate a set of quadrimodal fault normal vectors from the strain cyclide;
  determine an in-plane shear strain magnitude and a shear strain orientation associated with a quadrimodal fault from the set of quadrimodal fault normal vectors; and
  determine a hydrocarbon reservoir development plan based, at least in part, on the in-plane shear strain magnitude and the shear strain orientation,
    wherein the hydrocarbon reservoir development plan comprises a wellbore trajectory planned to penetrate a hydrocarbon reservoir within the subterranean region of interest.

13. The system of claim 12, wherein the strain tensor comprises an infinitesimal strain tensor obtained from the wellbore tool.

14. The system of claim 12, wherein determining the strain cyclide comprises:

determining four cyclide parameters based on a plurality of combinations of three principle components of the strain tensor; and forming a surface in cartesian space, wherein the surface is defined by a function quartic in each cartesian coordinate and by the four cyclide parameters.

15. The system of claim 12, wherein calculating the set of quadrimodal fault normal vectors from the strain cyclide comprises predicting a set of fault orientation angles based, at least in part, on the strain cyclide and a plane of no finite linear strain.

16. The system of claim 15, wherein predicting the set of fault orientation angles comprises determining a set of intersection points of the strain cyclide with the plane of no finite linear strain.

17. The system of claim 12, further comprising a drilling system configured to drill the wellbore trajectory to penetrate the hydrocarbon reservoir.

* * * * *